(12) United States Patent
Dietrich

(10) Patent No.: US 6,199,170 B1
(45) Date of Patent: Mar. 6, 2001

(54) METHOD AND APPARATUS FOR PRECISE TIME SYNCHRONIZATION

(75) Inventor: Sven Dietrich, Sunnyvale, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/310,065

(22) Filed: May 11, 1999

(51) Int. Cl.$^7$ ................................................ G06F 1/14
(52) U.S. Cl. ................................... 713/400; 713/503
(58) Field of Search .................... 713/400, 502, 713/503

(56) References Cited

U.S. PATENT DOCUMENTS

| | | | |
|---|---|---|---|
| 5,337,308 | * 8/1994 | Fan | 370/388 |
| 5,471,631 | * 11/1995 | Beardsley et al. | 713/502 |
| 5,812,528 | * 9/1998 | VanDervort | 370/235 |
| 6,026,074 | * 2/2000 | Stadler et al. | 370/230 |

* cited by examiner

Primary Examiner—Thomas M. Heckler
(74) Attorney, Agent, or Firm—Bakely, Sokoloff, Taylor & Zafman LLP

(57) ABSTRACT

An improved time transfer mechanism and method are disclosed. In one embodiment, the present invention provides a computer implemented method for transferring time, includes generating a first time stamp at a processor; triggering a time transfer event; generating a second time stamp at the processor; and receiving a reference time stamp at the processor. Triggering the time transfer event can further include sending a request for a time stamp signal to a device that is dedicated to time synchronization. The present invention also includes specific hardware for performing the time transfer method.

32 Claims, 5 Drawing Sheets

METHOD AND APPARATUS FOR PRECISE TIME SYNCHRONIZATION

FIELD OF THE INVENTION

This invention relates to time synchronization, and more particularly to time transfer from an external reference clock to a computer or other digital device.

BACKGROUND OF THE INVENTION

Local computers use highly precise external reference clocks to correct any internal errors that the clocks in the local computer may have. Typical reference clocks signal the start of a second by transmitting a synchronization signal, such as a pulse per second, which must be captured by the local computer's synchronization interface, and subsequently time-tagged with a local time stamp. The local system then uses the synchronization signal to generate its own estimate of its own clock's error.

For example, the local, or host computer, will receive and time stamp a pulse, which is sent at the beginning of a second. If the internal clock of the local computer has elapsed one-half second, then the internal clock is off by this amount. The local computer then looks for the next pulse, and steers the local clock so that it is synchronized with the external reference clock.

However, it is extremely difficult to precisely synchronize a local clock with a reference clock. A synchronization signal emitted by a reference clock incurs multiple sources of delay before it can be tagged with a local time stamp by the local computer. Constant delays, such as delays due to signal transmission along a cable, can be accounted for by adding the delay to the reference time stamp. Variable delays caused by interrupts and contention for access to the central processing unit (CPU), however, are for unknown lengths of time. Therefore, these variable delays cannot be accurately corrected, and are a source of an unknown error in time transfer and synchronization processes.

For example, whether one or more interrupts occurred before the time stamp is assigned to the synchronization signal is unknown. Also, the amount of time that each interrupt lasted is unknown and variable. Therefore, the synchronization signal may be assigned a time stamp by the host CPU as soon as it is received, or it may not receive a time stamp until 10,000 micro seconds or more have elapsed.

Even timing signals generated by high-performance time generation devices, such as cesium clocks and the like may degenerate in accuracy due to the inherent delays, such as interrupts and contentions, of multiprocessing computer systems. Deterministic high-precision time transfer to contemporary computer workstations is therefore not possible using external reference pulses due to the lack of known constants among these delays.

Clearly, a need exists to reduce or eliminate the delays that last for unknown lengths of time. A need also exists to determine an error bound for the synchronization signal received from the reference clock, so that any delays that do occur can be measured. Once the error bound is determined, fairly precise synchronization can be achieved using a number of known synchronization techniques.

SUMMARY OF THE INVENTION

The present invention discloses an improved time transfer mechanism. In one embodiment, the present invention is a method for transferring time, comprising generating a first time stamp at a processor; triggering a time transfer event to an external device; generating a second time stamp at the processor; and receiving a reference time stamp at the processor. Triggering the time transfer event can further include sending a request for a time stamp signal to a device that is dedicated to time synchronization. The present invention also includes specific hardware for performing the time transfer method.

DETAILED DESCRIPTION

The present invention provides for transferring time from an external reference clock, such as a cesium or rubidium clock or a UTC reference signal (Universal Time Coordinated is an international time base formerly known as Greenwich Mean time), including Global Positioning Systems (GPS), Long Range Navigation receivers (Loran), or WWV (a national time standard that is broadcast by radio signal under the call letters WWV by the U.S. National Bureau of Standards), for example, to a primary time server, a computer, or other digital device utilizing an on-board clock, for example an oscillator, while eliminating unknown delays that may occur during the time transfer. The present invention has the ability to determine the error bounds of the time transfer from the external clock to the host computer. Therefore, known synchronization techniques such as a phase locked loop can be applied to more effectively synchronize the local clock to the external reference clock.

Figure 1:
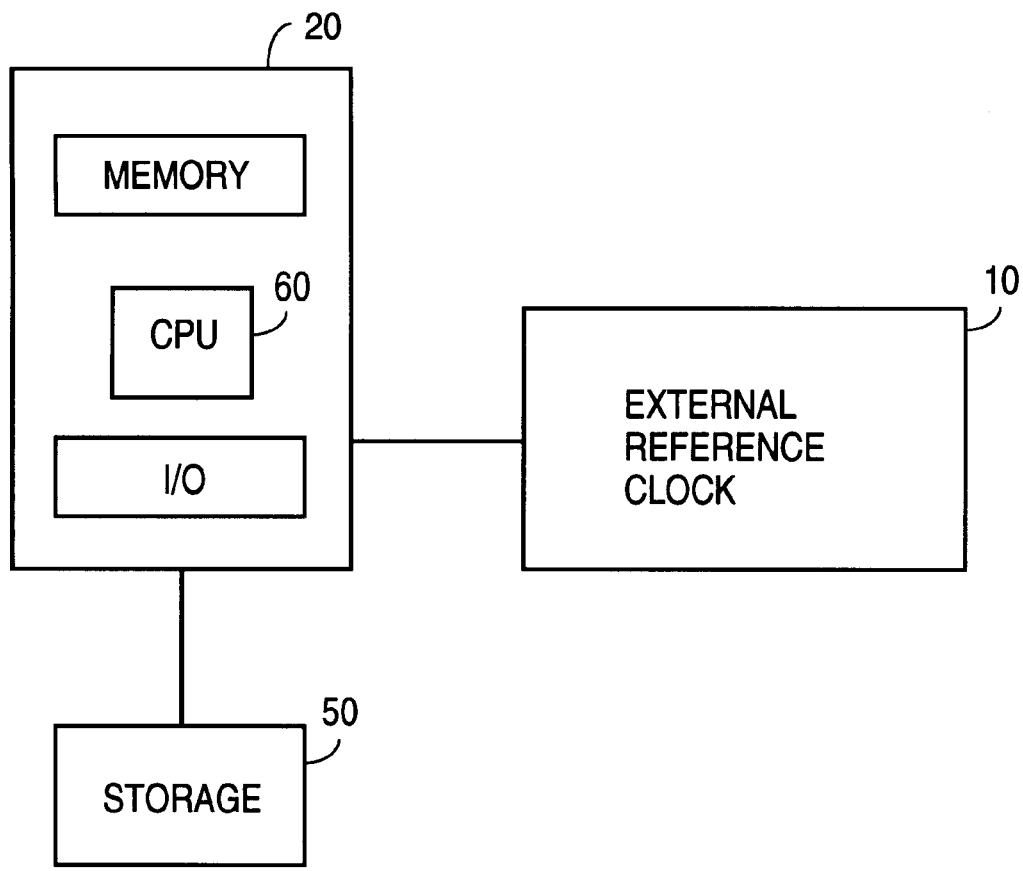
FIG. 1 shows an embodiment of the time transfer device of the present invention.
Figure 2:
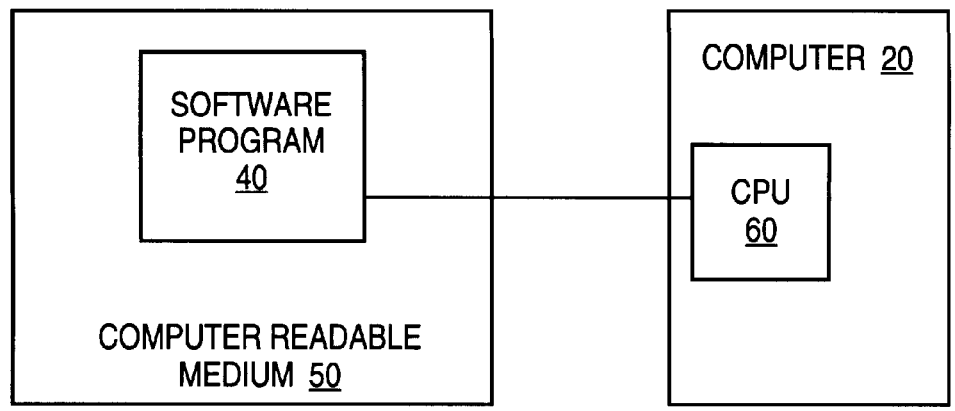
FIG. 2 shows a computer memory for storing a software program of the present invention, along with computer hardware for reading and executing the software program.
Figure 3:
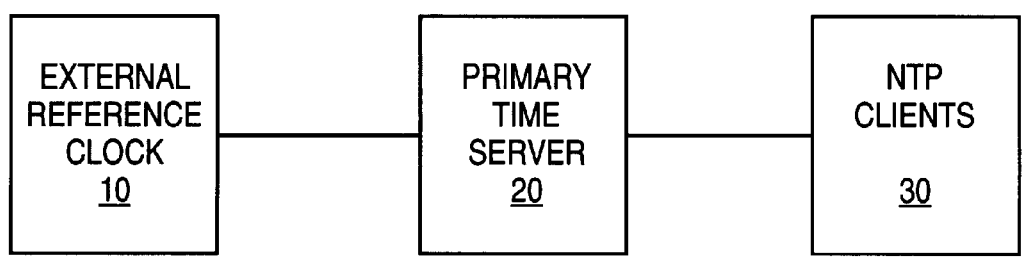
FIG. 3 shows another embodiment of the time transfer device of the present invention used for time synchronization.

An embodiment of the time transfer mechanism of the present invention is shown in FIG. 1. An external reference clock 10, is connected to digital device 20 having a local clock, such as workstation, or a network server, for example. In one embodiment, the time transfer mechanism may include a computer software program, 40, stored in a computer readable medium 50, such as computer memory, as shown in FIG. 2. The CPU 60 of computer 20 reads the software program from memory and executes the program to perform the method of the present invention. Alternately, the mechanism may be hard coded, implemented in hardware or a combination of hardware and software. Another embodiment of the present invention uses a host computer 20 as a primary time server for one or more client computers 30, as shown in FIG. 3.

Figure 4:
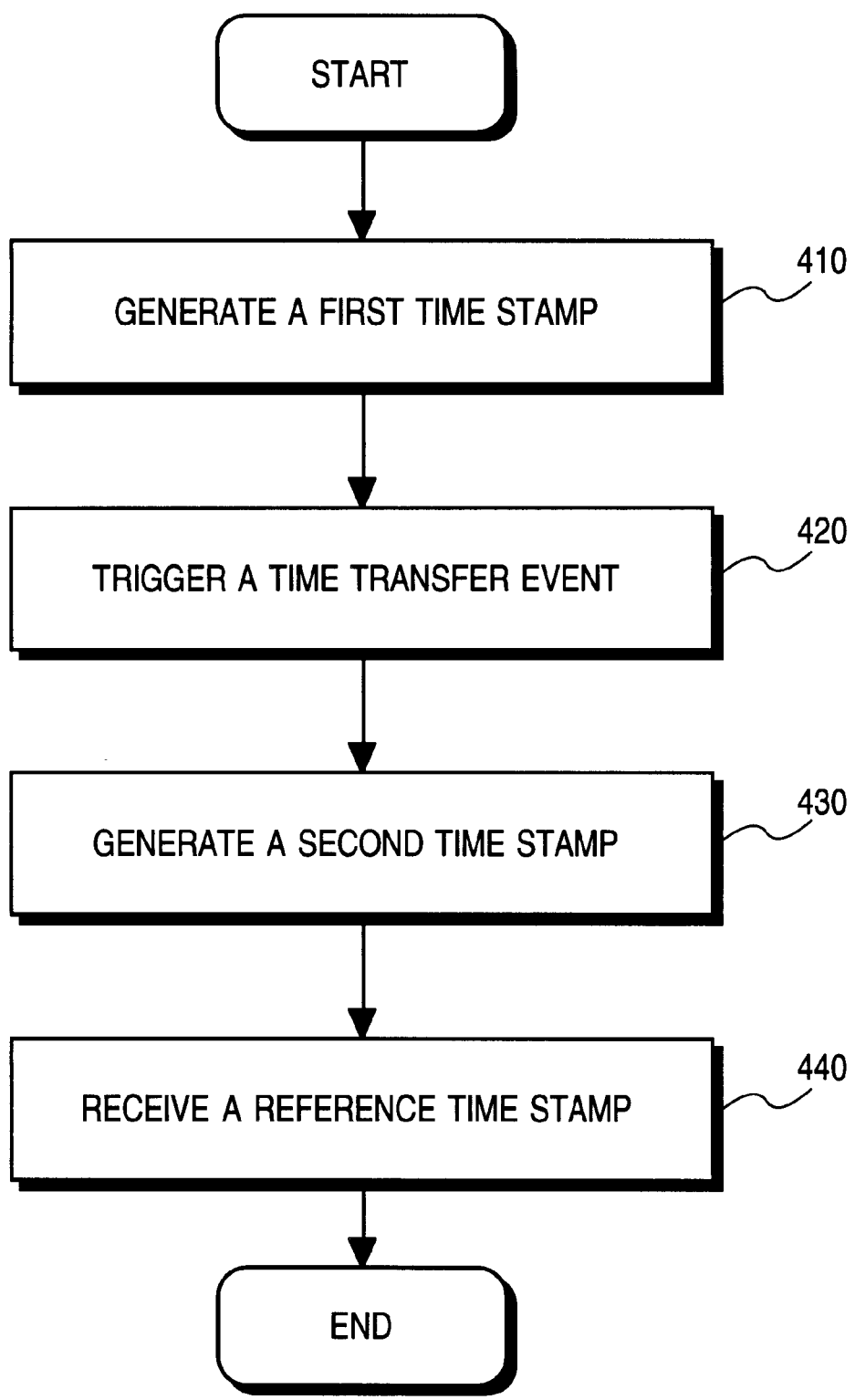
FIG. 4 shows a method for implementing the time transfer of the present invention.
Figure 5:
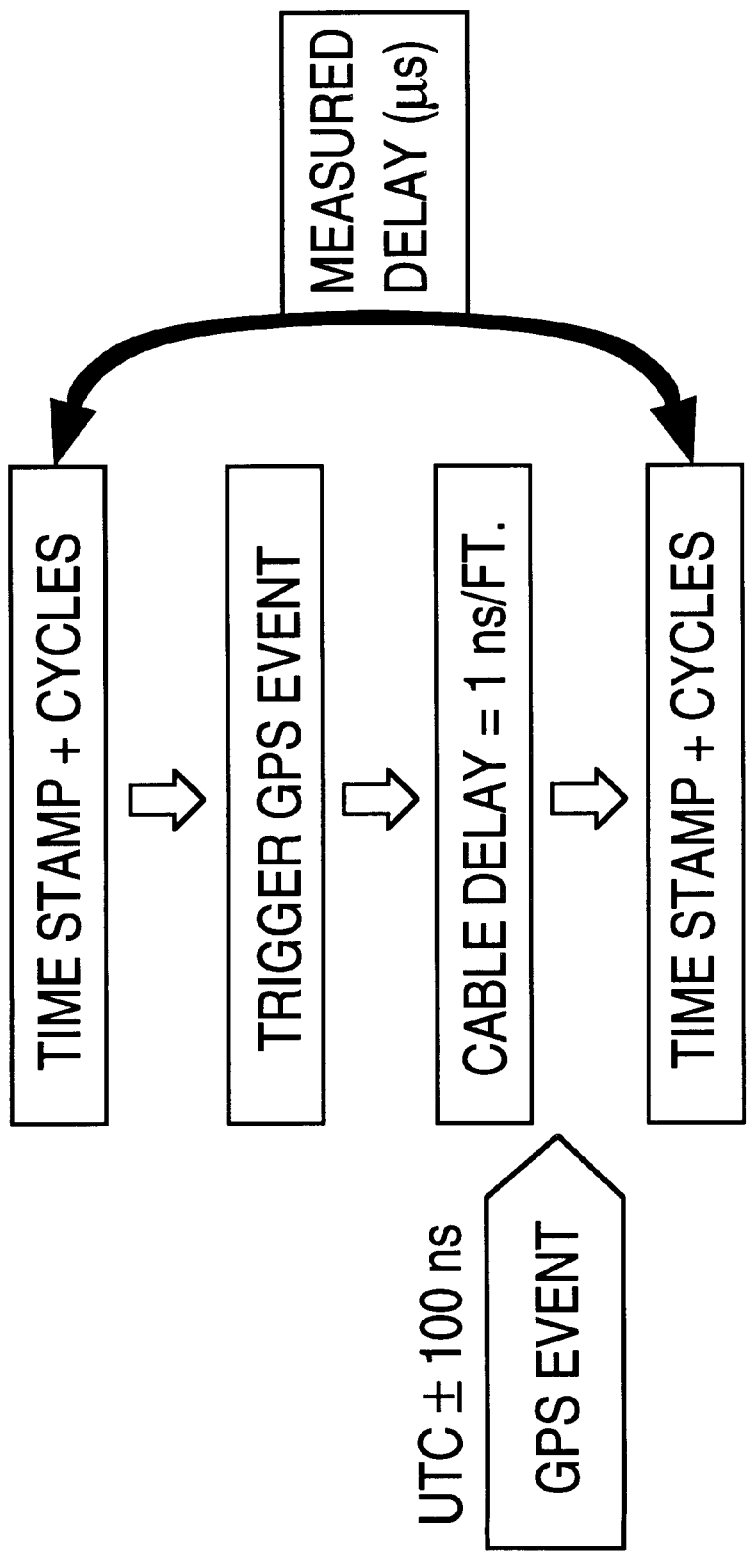
FIG. 5 shows another embodiment of the method of time transfer according to the present invention.

Embodiments of the method for transferring time from the external reference to the digital device are shown in FIGS. 4 and 5. In these embodiments, for purposes of discussion, the digital device is a computer system; however, as noted above, the digital device may be embodied as a variety of devices. Referring to FIG. 4, the computer generates a first time stamp, step 410. After the first time stamp is generated, an event is triggered, step 420. This event is a signal that is sent from the computer 20 to the external reference clock 10. After the event is triggered, another time stamp at the computer is generated, step 430. The reference time stamp signal, or data packet, is received, step 440. Thus, the two time stamps generated at the computer will define the maximum boundaries of the error of the time stamp subsequently received from the external reference clock.

The external clock 10, upon receiving the event trigger from the computer 20, generates a reference time stamp within a predetermined amount of time. This external time stamp is subsequently received, step 440, by computer system 20. The first and second time stamps generated at the computer are saved until the external time stamp is received. Transmission of the external time stamp from the reference clock to the computer 20 may not occur for a significant amount of time (e.g. 0.5 seconds) after the event is triggered and the second time stamp is taken. The precision of the time transfer is governed by the response time of the reference clock to the incoming timestamp request, and the precision with which the computer 20 can read its own clock.

The time transfer is complete after the second time stamp is taken at the computer. However, the computer cannot apply that information to its clock until the time stamp from the external reference clock has been received by the computer. Once the external time stamp is received, all the information needed to determine a precise difference between the local computer time and the external time has been acquired by the computer.

For example, the time difference between the external time stamp and the computer can be established by taking the average of the two local time stamps. This average provides a good estimate of the local time when the event was triggered, and can be compared to the external time stamp to get an offset between the two clocks. The error bound can be established by taking one half of the difference between the time at the two local time stamps, $t_1$ and $t_2$, so that the error bound is $\pm(t_2-t_1)/2$. This information can then be fed to a synchronization mechanism, such as a phase locked loop, to actually steer the computer clock.

In one embodiment, the external reference clock is a positioning system that is configured to provide the reference time stamp. For example, the clock may be a positioning system receiver, including but not limited to a GPS. Also, a wide area augmentation system (WAAS), or a local area augmentation system (LAAS) may be used to enhance the accuracy of the GPS.

Although the methods and apparatus of the present invention have been described with reference to GPS satellites, the teachings are equally applicable to positioning systems which utilize pseudolites or a combination of satellites and pseudolites. Pseudolites are ground-based transmitters which broadcast a PRN code (similar to a GPS signal) modulated on an L-band carrier signal, generally synchronized with GPS time. Each transmitter may be assigned a unique PRN code to permit identification by a remote receiver. Pseudolites are useful in situations where GPS signals from an orbiting satellite might be unavailable, such as tunnels, mines, buildings or other enclosed areas. The term "satellite", as used herein, is intended to include pseudolite or equivalents of pseudolites, and the term GPS signals, as used herein, is intended to include GPS-like signals from pseudolites or equivalents of pseudolites. Also, the methods and apparatus of the present invention are equally applicable for use with the GLONASS and other satellite-based positioning systems.

Upon receipt of the event an interrupt of the highest priority is issued in order for the receiver to generate a reference time stamp within a predetermined amount of time. In one embodiment, the GPS receiver is the Palisade product sold by Trimble Navigation Limited, Sunnyvale Calif. In such an embodiment the predetermined amount of time to generate the reference time stamp may be 40 nano seconds.

Therefore, the present invention offloads a significant portion of the synchronization work to an external reference clock, such as a GPS receiver. Although the external reference clock may be performing other tasks, the device is configured to be primarily dedicated to providing a synchronization data packet, such as the reference time stamp, to the computer. Unlike the computer, when the external reference clock receives the event trigger from the computer, the clock can assign the highest priority to generating a reference time stamp, and therefore generate deterministic time stamps.

The reference time stamp may not be transmitted before the computer generates the second time stamp. However, this reference time stamp will always be generated in between the first and the second local time stamps, which are taken before and after the event trigger. The response time of the external reference clock to the event is normally smaller than the time between the local time stamps that defines the error boundaries.

For example, suppose the first time stamp $t_1$ is taken at time 10 micro seconds, and the second time stamp $t_2$ is taken at time 14 micro seconds. Then 4 micro seconds have passed from the time before the event to request the external time stamp was triggered until after the event was triggered. The reference time stamp is generated within this time boundary defined by $t_1$ and $t_2$, because the external reference clock generates the reference time stamp within a predetermined amount of time after receiving the event, which is less than the time between the local time stamps. The response time of the external reference clock to the event may be 40 nano seconds, for example, which is much less than the error bound of 4 micro seconds. The margin of error can thus be described as $\pm2$ micro seconds, which is the known error bound of the time stamp from the reference clock. The error associated with the time transfer process is thus bounded on the local computer system.

The error bound that is defined by the two local time stamps can be reduced to the response time of the reference time clock itself. For example, if generating the two local time stamps before and after the event trigger takes 82 nano seconds, then the error bound is $\pm41$ nano seconds, which is still larger than the response time of an external time clock having a response time of 40 nano seconds. Thus, this process renders the error bounds of the time transfer process deterministic.

In an alternate embodiment, the present invention measures the time that has elapsed during the process, by using the two local time stamps, as shown in FIG. 5. Therefore, even if an interrupt occurs during this process, the present invention will notice that an interrupt or other time consuming event has occurred. If the delay in the time transfer process is so long that the error boundary between the two local time stamps is very high, the reference time stamp is discarded. The process is repeated so that a more precise error boundary for the time stamp from the external clock is achieved.

The amount of time that the computer uses to process the instructions for executing the steps shown in FIGS. 4 and 5 can be measured. For example, the computer may take 4 micro seconds to generate a first local time stamp, send an event trigger to the external clock, and generate a second local time stamp. Because this time between the first and second local time stamps is known, receipt of the time stamp from the external clock is not time critical.

If an interrupt does occur at the computer during the time transfer process, then the elapsed time in between these two time stamps will not be 4 micro seconds, as it was when there were no interrupts. Instead, it will be a larger amount of time, such as 114 micro seconds, for example. Longer time-transfers such as this are caused by program execution delays, such as interrupts and contention at the CPU. When these delays occur, the present invention can still bound the error as ±57 micro seconds.

These measured delays can then be used to refine the accuracy of the time transfer. For example, if the error bound is too high, such as ±57 micro seconds, then the time transfer process can be repeated until a more precise error boundary for the time stamp from the external clock is achieved.

In another embodiment of the present invention, the time-transfer process can be repeated several times. The present invention can then take the average of each time-transfer result, figure out the standard deviation and accept only those time transfer results that took less than a certain amount of time, such as 10 micro seconds, for example. Any time transfers that take longer than a certain amount of time have an error bound that may be intolerable, and are therefore discarded.

Thus, the present invention offloads synchronization work to a dedicated device. The present invention uses the local clock on the computer to measure program execution delays by taking pre and post event trigger time readings. It also uses the event trigger with the fixed known response characteristics that are given to obtain an external time sample.

The present invention provides for a method of achieving deterministic bounded time transfer. A system designer can reduce the time between the two local time stamps to the time for the fixed delays, such as cable delays which are known constants, and the variable error bound of the reference clock, which may be as low as ±100 nano seconds, or less.

Figure 6:
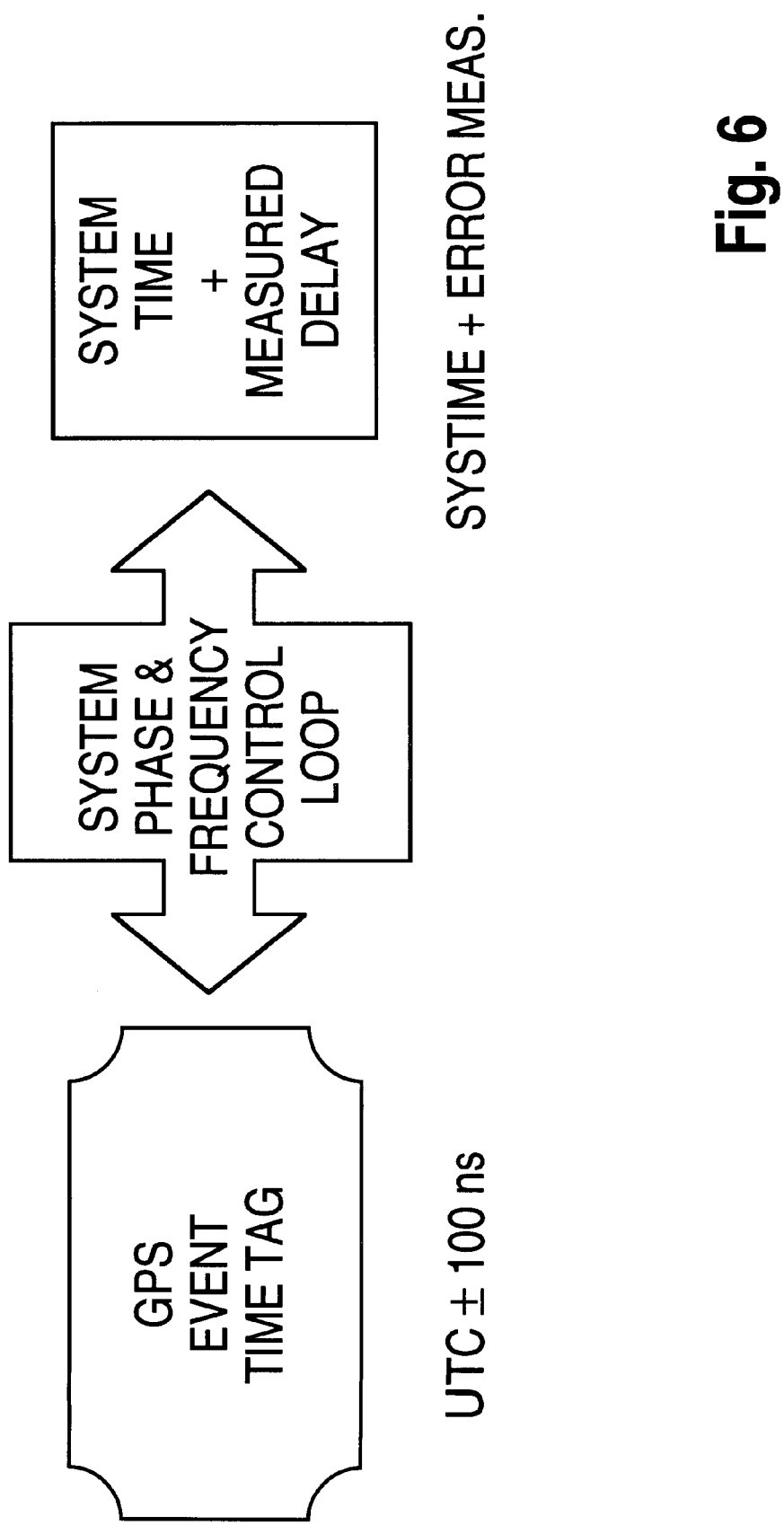
FIG. 6 shows the time transfer of the present invention used to perform time synchronization between an external reference clock and a computer.

After time transfer has been achieved, the present invention can use the delay information and time stamps to precisely synchronize clocks by using a variety of known processes, such as phase locked loop, for example, as shown in FIG. 6. Once the clock of the computer is synchronized with the external reference clock, the computer can then be used as a primary time server to synchronize client clocks of other coupled devices including devices located on a computer network.

I claim:

1. A method for determining error boundaries of a reference time stamp received by a first device, comprising:
   generating a first time stamp at the first device;
   triggering a time transfer event at the first device to cause a second device to send a reference time stamp signal to the first device;
   generating a second time stamp at the first device; and
   receiving the reference time stamp signal at the first device;
   wherein the error boundaries of the reference time stamp are determined by the first and second time stamps.

2. The method of claim 1, wherein the reference time stamp is repeated by a signal.

3. The method of claim 1, wherein triggering the time transfer event further comprises:

causing a request for a reference time stamp signal being sent to the second device that is dedicated to time transfer; and
the reference time stamp is generated by the dedicated second device.

4. The method of claim 3, wherein the second device generates the reference time stamp within a determined amount of time after receipt of the request for time stamp signal.

5. The method of claim 1, wherein the first & second time stamps generate error boundaries for the reference time stamp.

6. The method of claim 5, wherein a clock is adjusted using the reference time stamp.

7. The method of claim 5, wherein the reference time stamp is discarded if the error boundaries are greater than a given amount of time.

8. The method of claim 1, wherein an external reference clock is configured to generate the reference time stamp.

9. The method of claim 8, wherein the external reference clock is selected from the group consisting of:
   a positioning receiver, a UTC receiver, a WWV receiver, a GLONASS receiver, a LORAN-C receiver, WAAS receiver, LAAS receiver, and a global positioning system receiver.

10. The method of claim 9, wherein the signal is a data packet.

11. An article of manufacture comprising:
    a computer readable media comprising instructions, which when executed by a processing system perform the following steps for time transfer comprising:
    generating a first time stamp at the first device;
    triggering a time transfer event at the first device to cause a second device to send a reference time stamp to the first device;
    generating a second time stamp at the first device; and
    receiving the reference time stamp signal at the first device.

12. The article of manufacture of claim 11, wherein an external reference clock is configured to generate he reference time stamp.

13. The article of manufacture of claim 11, wherein the external reference clock is selected from the group consisting of:
    a positioning receiver, a UTC receiver, a WWV receiver, a GLONASS receiver, a LORAN-C receiver, WAAS receiver, LAAS receiver, and a global positioning system receiver.

14. The article of manufacture of claim 11, wherein the reference time stamp is repeated by a signal.

15. The article of manufacture of claim 14, wherein the signal is a data packet.

16. The article of manufacture of claim 11, wherein triggering the time transfer event further comprises:
    causing a request for a time stamp signal being sent to the second device that is dedicated to time synchronization; and
    the reference time stamp is generated by the dedicated second device.

17. The article of manufacture of claim 16, wherein a clock signal is adjusted using the reference time stamp.

18. The article of manufacture of claim 16, wherein the reference time stamp is discarded if the error boundaries are greater than a given amount.

19. The article of claim 16, wherein the second device generates the reference time stamp within a determined amount of time after receipt of the request for time stamp signal and transmits the reference time stamp to the first device.

20. An apparatus for determining error boundaries of a reference time stamp comprising:
   a first device configured to generate a first time stamp, trigger a time transfer event, generate a second time stamp, and receive a reference time stamp signal in response to the time transfer event; wherein the first and second time stamps define the error boundaries of the reference time stamp.

21. The apparatus of claim 20, wherein the reference time stamp is requested by a signal.

22. The apparatus of claim 21, wherein the signal if a data packet.

23. The apparatus of claim 20, further comprising:
   a second device configured to receive the time transfer event, generate a reference time stamp, and send the reference time stamp to the first device.

24. The apparatus of claim 23, wherein the second device generates the reference time stamp within a determined amount of time after receipt of the time transfer event.

25. The apparatus of claim 23, wherein the second device is selected from the group consisting of a positioning receiver, a UTC receiver, a WWV receiver, a GLONASS receiver, a LORAN-C receiver, WAAS receiver, LAAS receiver, and a global positioning system receiver.

26. The apparatus of claim 23, wherein a clock is adjusted using the reference time stamp.

27. The apparatus of claim 23, wherein the reference time stamp is discarded if the error boundaries are greater than a given amount.

28. The apparatus of claim 23, wherein the first device is selected from the group consisting of a digital device, a processing system, and a network server.

29. An article of manufacture comprising:
   a computer usable medium having computer readable program code means embodied therein for determining error boundaries of a reference time stamp received by a first device, the computer readable program code means in said article of manufacture comprising:
   means for generating a first time stamp at the first device;
   means for triggering a time transfer event at the first device to cause a second device to send a reference time stamp to the first device;
   means for generating a second time stamp at the first device; and
   means for receiving a reference time stamp at the first device;
   wherein the error boundaries of the reference time stamp are determined by the first and second time stamps.

30. An apparatus for determining error boundaries of a reference time stamp, comprising:
   a first device configured to generate a first time stamp, trigger a time transfer event, generate a second time stamp, and receive a reference time stamp in response to the time transfer event,
   a second device configured to receive the time transfer event, generate a reference time stamp, and send the reference time stamp to the first device;
   wherein the first and second time stamps define the error boundaries of the reference time stamp.

31. The apparatus of claim 30, wherein the second device generates the reference time stamp signal within a determined amount of time after receipt of the time transfer event signal.

32. The apparatus of claim 30, wherein the second device is selected from the group consisting of a positioning receiver, a UTC receiver, a WWV receiver, a GLONASS receiver, a LORAN-C receiver, WAAS receiver, LAAS receiver, and a global positioning system receiver.

* * * * *